July 2, 1946.  W. H. PHELPS  2,403,236
LAWN MOWER BLADE
Filed Aug. 27, 1943  3 Sheets-Sheet 1

Inventor:
William H. Phelps,
By Christen, Mills, Davies,
Schroeder & Merriam, Attys.

July 2, 1946.　　W. H. PHELPS　　2,403,236
LAWN MOWER BLADE
Filed Aug. 27, 1943　　3 Sheets-Sheet 2
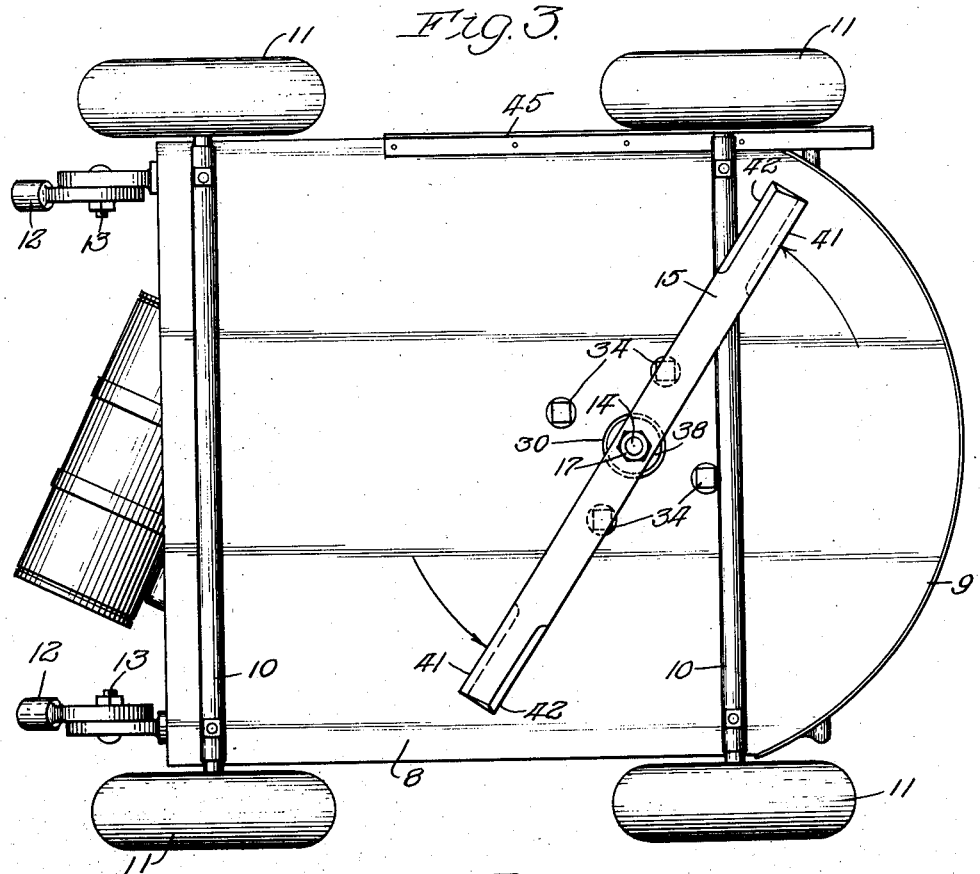

July 2, 1946.　　W. H. PHELPS　　2,403,236
LAWN MOWER BLADE
Filed Aug. 27, 1943　　3 Sheets-Sheet 3

Patented July 2, 1946

2,403,236

UNITED STATES PATENT OFFICE 2,403,236

LAWN MOWER BLADE

William H. Phelps, Ralston, Nebr.

Application August 27, 1943, Serial No. 500,213

4 Claims. (Cl. 56—295)

One of my objects is to provide improvements in lawn mowers of the type having a substantially horizontally disposed cutting blade carried by a substantially, vertically disposed rotating shaft, to the end of rendering the mower better adapted for its purpose and more particularly for the cutting of tall grass and weeds.

Another, more specific, object is to provide means whereby the accurate vertical adjustment of the blade for the cutting of the grass or weeds close to the ground or at selected distances from the ground, may be affected; and of such construction that the lower bearing for the vertical shaft carrying the blade shall be maintained at a predetermined distance from the blade, regardless of the vertical adjustment of the blade, thereby permitting the shaft to be provided of much smaller diameter, to avoid springing of the shaft, than in the case of constructions wherein the distance from the blade to the lower bearing varies according to the elevation to which the blade is adjusted.

Another object is to provide a construction of blade of the type above referred to whereby in its operation there is no tendency of the blade to lift at high speeds or lower as the speed decreases.

Another object is to provide a construction of blade of the type above referred to whereby the blade may be used in either of two positions to perform the cutting operation, thereby being reversible.

Another object is to provide in a mechanism for translating power, through an endless belt especially of the V-type, from a drive member to a driven member disposed at an angle to said drive member and closely adjacent thereto and which involves a twisted condition of the belt, for the accurate aligning of the belt with relation to said members to insure the proper engagement of the reaches of the belt with said members, particularly to the end of preventing disengagement of the belt from said members and producing the maximum effective driving of the driven member; and other objects as will be understood from the following description:

Referring to the accompanying drawings:

Figure 3 is a bottom plan view of the machine.

Figure 4 is a fragmentary view of the machine, partly in section, the section being taken at the irregular line 4—4 on Fig. 1 and viewed in the direction of the arrows.

Figure 5 is a fragmentary perspective view of the cutting blade of the machine.

Figure 1:
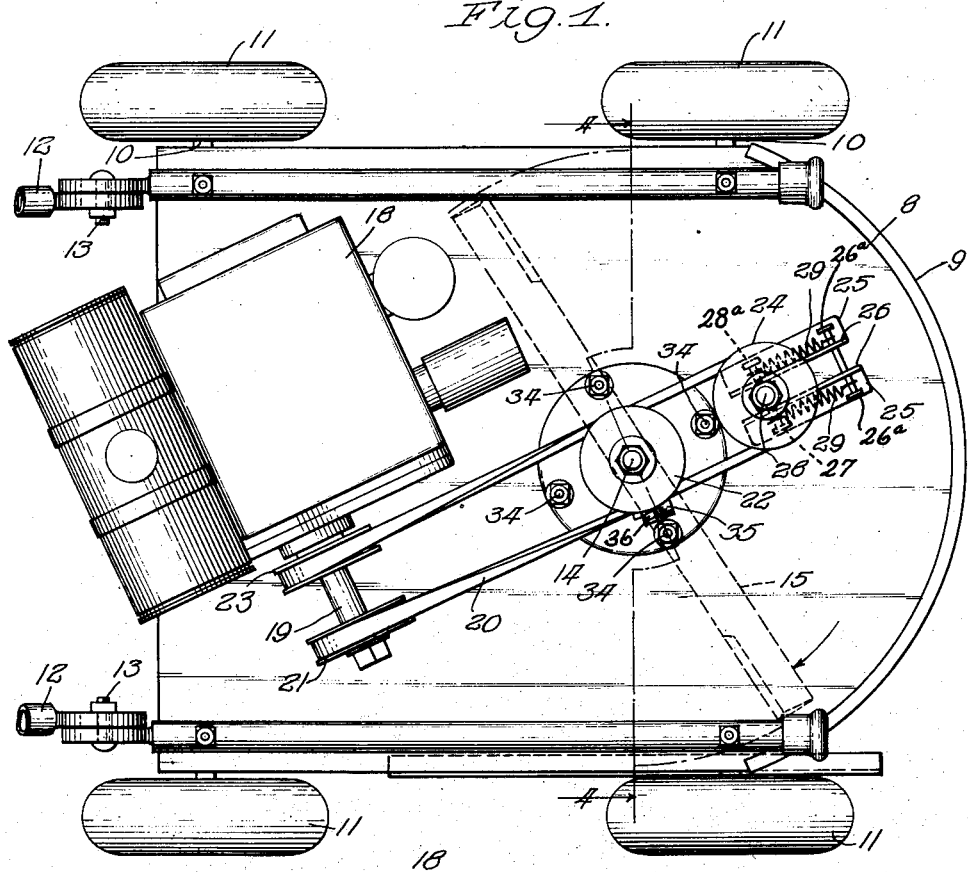
Figure 1 is a plan view of a lawn mower embodying my improvements.
Figure 2:
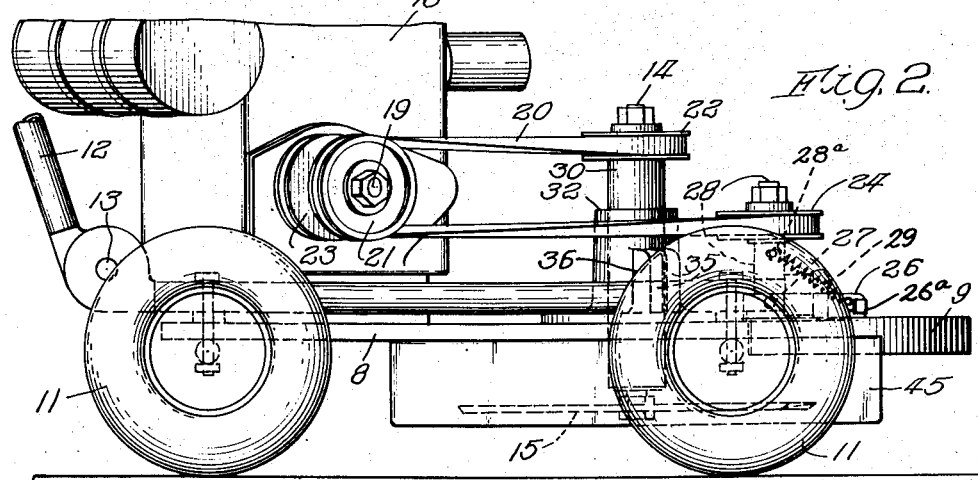
Figure 2 is a broken view in side elevation of the machine of Fig. 1.

Referring to the construction of machine shown in Figs. 1—5, it comprises a platform 8 having a buffer strip 9 of resilient material at its front end. The platform 8 is supported on a pair of axles 10 provided with ground wheels 11 journaled thereon, the platform being provided with a handle member formed of parallel handle-bars 12 pivoted to the platform at 13, and connected together at their outer ends by a cross member (not shown).

Journaled on the platform 8 is a vertically disposed shaft 14, driven as hereinafter described, and provided on its lower end, beneath the platform 8, with a horizontal metal cutter blade 15 secured between its ends to the shaft 14 by lock nuts 16 and 17 on the shaft.

The shaft 14 is shown as driven, to rotate the blade 15, by means of a power device 18, as for example an internal combustion engine, mounted on the platform 8 with its shaft 19 substantially horizontal. The driving of the shaft 14 by the power device 18 is effected through the medium of an endless belt 20, preferably of the V-type, which is trained about a pulley 21 fixed on the shaft 19, a pulley 22 fixed on the shaft 14 and a pair of idler pulleys 23 and 24, the idler pulley 23, being journaled on the shaft 19 and the idler pulley 24 journaled on the platform 8 at the side of the pulley 22 opposite that at which the pulleys 21 and 23 are located; in the particular arrangement shown the pulleys 21 and 23 being spaced apart a distance substantially equal to the diameter of the pulley 22; the pulleys 21, 22, 23 and 24 being of the same diameter; the upper edge portions of the pulleys 21 and 23 being in substantially the same horizontal plane as the pulley 22, and the lower edge portions of the pulleys 21 and 23 being in substantially the same horizontal plane as the pulley 24.

As will be understood from the drawings, the belt 20, in accordance with the particular arrangement shown, extends from the pulley 21, thence to and partially around the pulley 22 and partially around the idler pulley 23 from which it extends to and partially around the idler-pulley 24 and back to the pulley 21.

The idler-pulley 24 is urged in a direction to maintain the belt 20 in taut condition for proper driving engagement with the pulleys, by means of a simple tensioning device. A pair of angle bars 25 are bolted to the platform and have upwardly extending flanges 26. The pulley is journalled on a shaft 28 which is pivotally mounted on a pin 27 extending through the flanges 26. The shaft 28 is provided with a pair of outwardly extending headed studs 28a, and the front of the flanges 26 are provided with outwardly extending headed studs 26a over which are looped the ends of a pair of tensioning springs 29 which serve to tension the belt 20.

The shaft 14 is shown as journaled on the platform 8 by means of a vertical tube 30 extending downwardly through an opening 31 in the platform 8 and rigidly held in vertically adjusted position by a split clamping head 32 through which the tube 30 extends, the head 32, by way of example, comprising a split metal casting bored about .006" larger than the external diameter of the tube. The clamping head 32 is shown as secured, at a flange 33 thereon, to the platform 8 by bolts 34, and at its split portion has opposed ears 35 in which a clamp screw 36 for tightening the clamp about the tube 30, is provided. Between the tube 30 and the shaft 14 are upper and lower ball-bearings 37 and 38 respectively, these bearings, make a pressed fit with the shaft 14 to prevent relative vertical movement of the bearings and this shaft, being pressed into sockets 39 and 40 in the upper and lower ends of the tube to prevent vertical movement of the bearings in the tube.

The cutting blade 15 is shown as formed of a straight bar beveled along its longitudinal edges, adjacent each end of the bar from opposite faces of the bar, to present at each end of the bar cutting edge portions 41 and 42 in the planes of the opposite faces of the bar.

The cutting blade 15 also presents at its opposite terminal end edge portions cutting edge portions 43 and 44 inclining relative to the planes in which the opposite faces of the blade extend, these cutting edge portions being formed by beveling the blade from its opposite faces toward the extremities of the blade.

The cutting portions 43 and 44 are provided for the purpose of exerting a cutting action on most of the vegetation cut by the longitudinal cutting portions of the blade, and particularly in co-operation with a mulching board 45 depending, close to the cutting portions 43 and 44, from the underside of the platform at its "off" side, serve to produce a fine mulch by hammer mill action against the mulching board.

Figure 6:
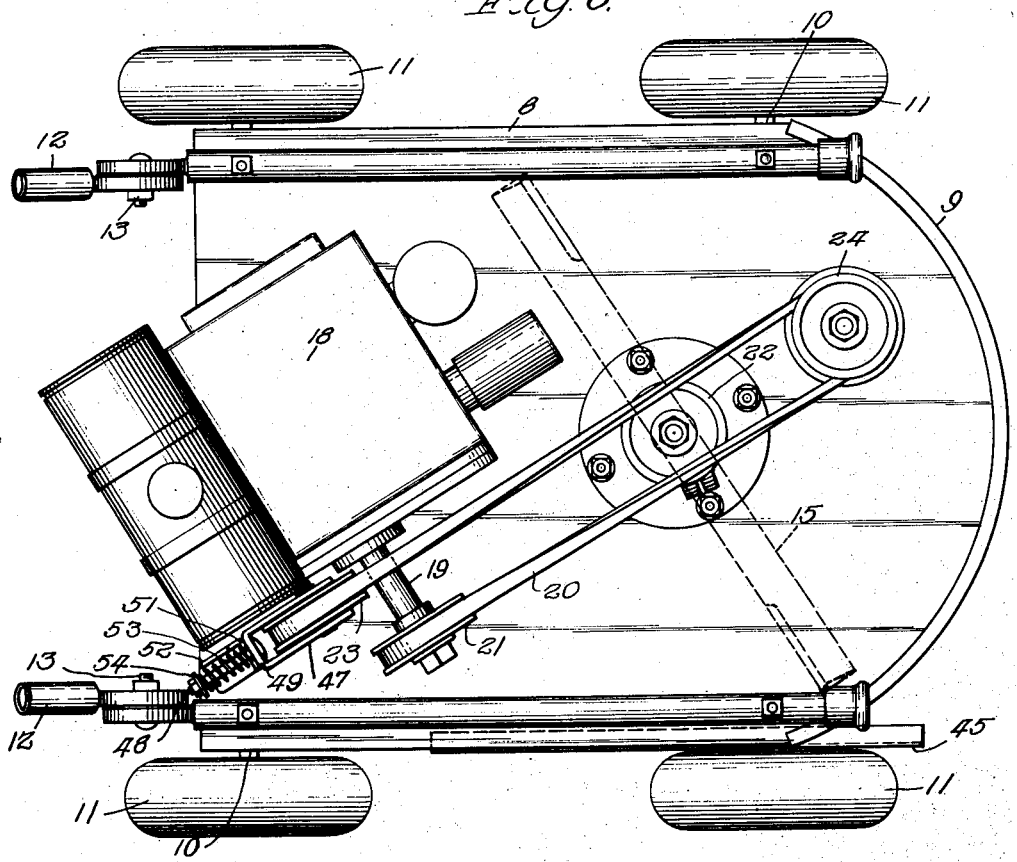
Figure 6 is a plan view of a modification of the machine of the preceding figures of the drawings.
Figure 7:
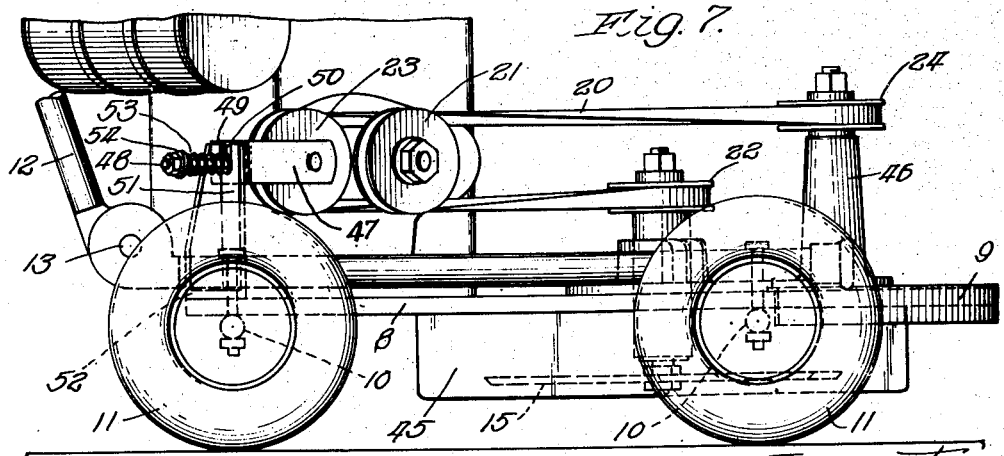
Figure 7, a broken view in side elevation of the machine of Fig. 6.

The construction shown in Figs. 6 and 7 is the same as that shown in Figs. 1—5, except that the idler pulley 24 instead of being associated with tensioning means as in the case of the idler pulley in Figs. 1—5, is mounted on a stationary post represented at 46; the idler pulley 23, instead of being journaled on the shaft 19 is journaled on a movable mounting having associated therewith spring-tensioning means for maintaining the belt taut; and the positions of the pulleys 22 and 24 relative to the upper and lower portions of the pulleys 21 and 23, as described with reference to the construction shown in Figs. 1—5, are reversed; the mounting for the idler pulley 23 and the tensioning means comprising a yoke 47 in which the idler pulley 23 is journalled, a rod 48 connected with the cross piece 49 of the yoke 47 and slidable in an opening 50 in an upstanding flange 51 of a bracket 52 secured to the platform 8, and a coil spring 53 surrounding the rod 48 and bearing at one end against the flange 51 of the bracket and at its opposite end against a stop-washer 54 on the outer end of the rod 48.

The feature of providing the vertically adjustable tube 30 with which the shaft 14 and blade 15 are adjustable vertically as a unit, is of practical advantage as the blade 15 in all positions of vertical adjustment is maintained at the same distance from the lower bearing 38, thereby permitting of the use of a shaft 14 of much smaller diameter than in those cases where this distance varies in the different positions of vertical adjustment of the blade 15.

The provision of the blade 15 as a straight bar is of advantage as the entire mass of the blade is in the same plane as the point of application thereto of the force for driving it, whereby there is no tendency of the blade to rise at high speeds and lower when the speed decreases. Furthermore, this feature of the blade in connection with its cutting edges 41 and 42 adjacent opposite faces of the blade, affords another advantage in that it permits the blade to be used in either of two positions; thus being reversible on the shaft carrying it to permit the two sets of longitudinal cutting portions 41 and 42 to be used selectively.

The provision of endless belt power translating mechanism as shown and described, and involving the translation of power from a drive member to a drive member disposed at an angle thereto, particularly at a right angle, is of great advantage as it makes possible the straight entry of the belt into all of the pulleys even where the drive and driven members are closely spaced, the spring tensioning means for one of the idlers automatically maintaining the correct belt tension.

What I claim as new and desire to secure by Letters Patent is:

1. A mower blade having a cutting portion at a terminal end edge portion thereof, disposed at an angle to the longitudinal axis of the blade, said cutting portion inclining relative to the planes in which the opposite faces of the blade extend, one of the longitudinal edges of the blade adjacent an end of the blade provided with a cutting portion extending lengthwise of the blade.

2. A straight mower blade adapted to be rotated about its center in a horizontal plane, a portion of the leading edge portion of each arm of the blade being chamfered upwardly and rearwardly to form a bottom cutting edge, and the free terminal edge portions of said arms being chamfered to form upwardly and rearwardly inclined cutting edges.

3. A blade as specified in claim 2, in which inclined cutting edges are disposed at right angles to the longitudinal axis of the blade.

4. A straight mower blade for support and rotation about a substantially vertical axis, one of the lower longitudinal edges of the blade having a straight cutting portion, and the terminal edge portion of said blade being sharpened to form a cutting edge which is inclined upwardly and rearwardly from the plane and direction of rotation of said blade.

WILLIAM H. PHELPS.